US011303150B1

United States Patent
Ludewig et al.

(10) Patent No.: US 11,303,150 B1
(45) Date of Patent: Apr. 12, 2022

(54) APPARATUS FOR INTERNET AND POWER BACKUP

(71) Applicant: DataRemote, Inc., Miami, FL (US)

(72) Inventors: Christopher Ludewig, Miami, FL (US); Robert Moses, Miami, FL (US)

(73) Assignee: DataRemote, Inc., Miami, FL (US)

( * ) Notice: Subject to any disclaimer, the term of this patent is extended or adjusted under 35 U.S.C. 154(b) by 0 days.

(21) Appl. No.: 17/541,830

(22) Filed: Dec. 3, 2021

(51) Int. Cl.
| | |
|---|---|
| *H02J 9/06* | (2006.01) |
| *H02J 7/00* | (2006.01) |
| *H04W 36/30* | (2009.01) |
| *G06F 1/26* | (2006.01) |
| *H04W 36/14* | (2009.01) |
| *H04W 36/38* | (2009.01) |
| *H04B 1/44* | (2006.01) |

(52) U.S. Cl.
CPC .............. *H02J 9/062* (2013.01); *G06F 1/263* (2013.01); *H02J 7/0068* (2013.01); *H04B 1/44* (2013.01); *H04W 36/14* (2013.01); *H04W 36/305* (2018.08); *H04W 36/38* (2013.01)

(58) Field of Classification Search
CPC .. H02J 9/062; H02J 7/0068; H02J 7/00; H02J 9/06; H04W 36/305; H04W 36/30; H04W 1/44; H04W 36/14; H04W 36/38; G06F 1/263; G06F 1/26
See application file for complete search history.

(56) References Cited

U.S. PATENT DOCUMENTS

| | | | |
|---|---|---|---|
| 10,404,521 B2 | 9/2019 | McChord et al. | |
| 11,086,731 B2 | 8/2021 | Lau et al. | |
| 2002/0178398 A1 | 11/2002 | Sekiguchi | |
| 2015/0365320 A1 | 12/2015 | Xu et al. | |
| 2017/0285081 A1 | 10/2017 | Silverman | |

*Primary Examiner* — Robert L Deberadinis
(74) *Attorney, Agent, or Firm* — Carter, DeLuca & Farrell LLP; George Likourezos

(57) ABSTRACT

An apparatus for internet and power backup includes a power source configured for powering the apparatus, an integrated battery configured for providing backup power to the apparatus, a first switch configured for selectively switching from a first mode where the power source supplies power to the apparatus and a second mode where the integrated battery supplies power to the apparatus, a sensor configured to detect a first signal indicating a presence of power from the power source, a network port, such as, for example, a network port, configured for Internet communications and communicatively coupled to an Internet gateway device, an integrated cellular modem configured for Internet communications, a second switch configured for selectively switching between a third mode where the internet communications is via the network port and a fourth mode where the internet communications is via the integrated cellular modem, a processor, and a memory coupled to the processor and storing one or more computer-readable instructions.

20 Claims, 4 Drawing Sheets

APPARATUS FOR INTERNET AND POWER BACKUP

TECHNICAL FIELD

The present application relates to internet gateways and, in particular, to an apparatus for internet and power backup.

BACKGROUND

As users are relying on increasing amounts of data connectivity, there are demands to have such data connectivity always available, even in the face of wide area network or power failure. Accordingly, there is interest in improvement via redundant systems.

SUMMARY

This disclosure relates to an apparatus for internet and power backup.

In accordance with aspects of the present disclosure, an apparatus for internet and power backup includes a power source configured for powering the apparatus, an integrated battery configured for providing backup power to the apparatus, a first switch configured for selectively switching from a first mode where the power source supplies power to the apparatus and a second mode where the integrated battery supplies power to the apparatus, a sensor configured to detect a first signal indicating a presence of power from the power source, a network port, such as, for example a Wide Area Network (WAN) port, configured for Internet communications and communicatively coupled to an Internet gateway device, an integrated cellular modem configured for Internet communications, a second switch configured for selectively switching between a third mode where the internet communications is via the network port and a fourth mode where the internet communications is via the integrated cellular modem, a processor, and a memory. The memory is coupled to the processor and stores one or more computer-readable instructions, that when executed by the processor, cause the apparatus to: determine whether or not the first signal indicates the presence of power from the power source, selectively switch the first switch to the second mode from the first mode based on the determination that the first signal does not indicate the presence of power from the power source, determine whether at least one of a presence or a quality of a second signal on the network port is below a predetermined threshold, and selectively switch the second switch to the fourth mode from the third mode based on the at least one of the presence or the quality of the second signal on the network port being below the predetermined threshold.

In an aspect of the present disclosure, the apparatus may further include a Foreign Exchange Station (FXS) port.

In an aspect of the present disclosure, the FXS port may be configured for POTS line replacement.

In another aspect of the present disclosure, the apparatus may further include a Global Positioning Satellite capability (GPS) receiver configured to monitor geographical location information of the apparatus.

In yet another aspect of the present disclosure, the instructions, when executed by the processor, may further cause the apparatus to monitor the geographical location of the apparatus using the GPS receiver, and electronically provide the monitored geographical location information of the apparatus when requested by emergency responders.

In a further aspect of the present disclosure, the apparatus may further include a power output connector configured to electrically couple to the Internet gateway device and provide power to the Internet gateway device.

In yet a further aspect of the present disclosure, the network port may be connected to at least one of cable, digital subscriber line, or fiber or other type of wide area network connectivity.

In accordance with aspects of the present disclosure, a computer-implemented method for internet and power backup is presented. The method includes determining whether or not a first signal sensed by a sensor indicates the presence of power from a power source electrically coupled to an apparatus. The power source is configured for powering the apparatus. The apparatus includes an integrated battery configured for providing backup power to the apparatus and a first switch configured for selectively switching from a first mode where the power source supplies power to the apparatus and a second mode where the integrated battery supplies power to the apparatus. The method further includes selectively switching the first switch to the second mode from the first mode based on the determination that the first signal does not indicate the presence of power from the power source. The network port is configured for Internet communications and communicatively coupled to an Internet gateway device. The method further includes selectively switching a second switch of the apparatus to a fourth mode from a third mode based on the at least one of the presence or the quality of the second signal on a network port, such as, for example a WAN port, of the apparatus t being below the predetermined threshold. The second switch is configured for selectively switching between the third mode where the internet communications is via the network port (e.g., via the internet gateway device) and the fourth mode where the internet communications is via an integrated cellular modem of the apparatus based on sensing that the Gateway has lost internet service and then providing internet via the backup apparatus via the integrated cellular modem.

In an aspect of the present disclosure, the apparatus may include an FXS port.

In another aspect of the present disclosure, the FXS port may be configured for POTS line replacement.

In yet another aspect of the present disclosure, the apparatus may further include a Global Positioning Satellite (GPS) receiver configured to monitor geographical location information of the apparatus.

In a further aspect of the present disclosure, the method may further include monitoring the geographical location of the apparatus using the GPS receiver and electronically providing the monitored geographical location information of the apparatus when requested by emergency responders.

In yet a further aspect of the present disclosure, the apparatus may further include a power output connector configured to provide power to the Internet gateway device.

In an aspect of the present disclosure, the WAN may be connected to cable, digital subscriber line, and/or fiber.

In accordance with aspects of the present disclosure, a non-transitory computer-readable storage medium in which is stored instructions for causing a processor to execute a computer-implemented method for internet and power backup is presented. The method includes determining whether or not a first signal sensed by a sensor indicates the presence of power from a power source electrically coupled to an apparatus. The power source is configured for powering the apparatus. The apparatus includes an integrated battery configured for providing backup power to the apparatus and a first switch configured for selectively switching from a first mode where the power source supplies power to the apparatus and a second mode where the integrated battery supplies power to the apparatus. The method further includes selectively switching the first switch to the second mode from the first mode based on the determination that the first signal does not indicate the presence of power from the power source and determining whether at least one of a presence or a quality of a second signal on a network port, such as, for example, a WAN port, of the apparatus is below a predetermined threshold. The network port is configured for Internet communications and communicatively coupled to an Internet gateway device. The method further includes selectively switching a second switch of the apparatus to a fourth mode from a third mode based on the at least one of the presence or the quality of the second signal on the network port being below the predetermined threshold. The second switch is configured for selectively switching between the third mode where the internet communications is via the network port and the fourth mode where the internet communications is via an integrated cellular modem of the apparatus.

In an aspect of the present disclosure, the apparatus may include an FXS port.

In another aspect of the present disclosure, the FXS port may be configured for POTS line replacement.

In yet another aspect of the present disclosure, the apparatus may further include a Global Positioning Satellite (GPS) receiver configured to monitor geographical location information of the apparatus.

In a further aspect of the present disclosure, the method may further include monitoring the geographical location of the apparatus using the GPS receiver and electronically providing the monitored geographical location information of the apparatus when requested by emergency responders.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
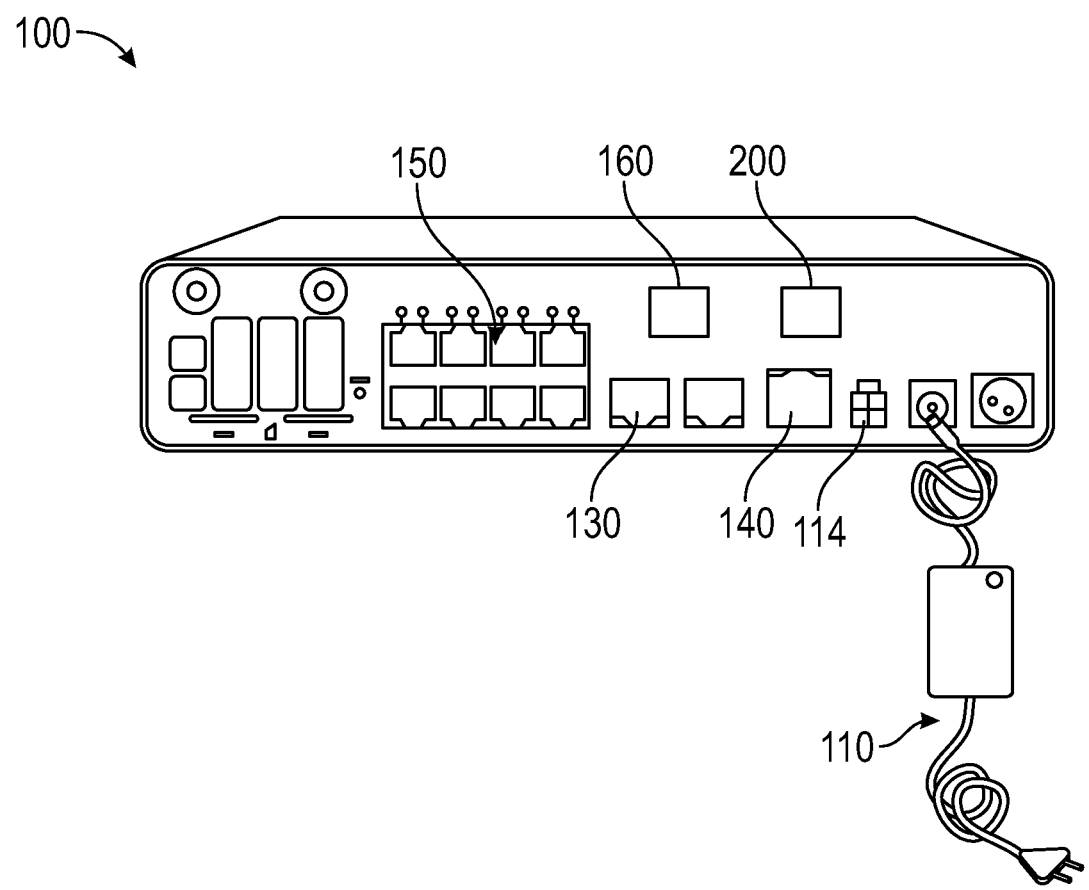
FIG. 1 is a rear view of an apparatus for Wide Area Network (WAN) and power backup in accordance with aspects of the present disclosure.

The present application relates to internet gateways and, in particular, to an apparatus for internet and power backup.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Various alterations, rearrangements, substitutions, and modifications of the inventive features illustrated herein, and any additional applications of the principles of the present disclosure as illustrated herein, which would occur to one skilled in the relevant art and having possession of this disclosure, are to be considered within the scope of the present disclosure.

Figure 2:
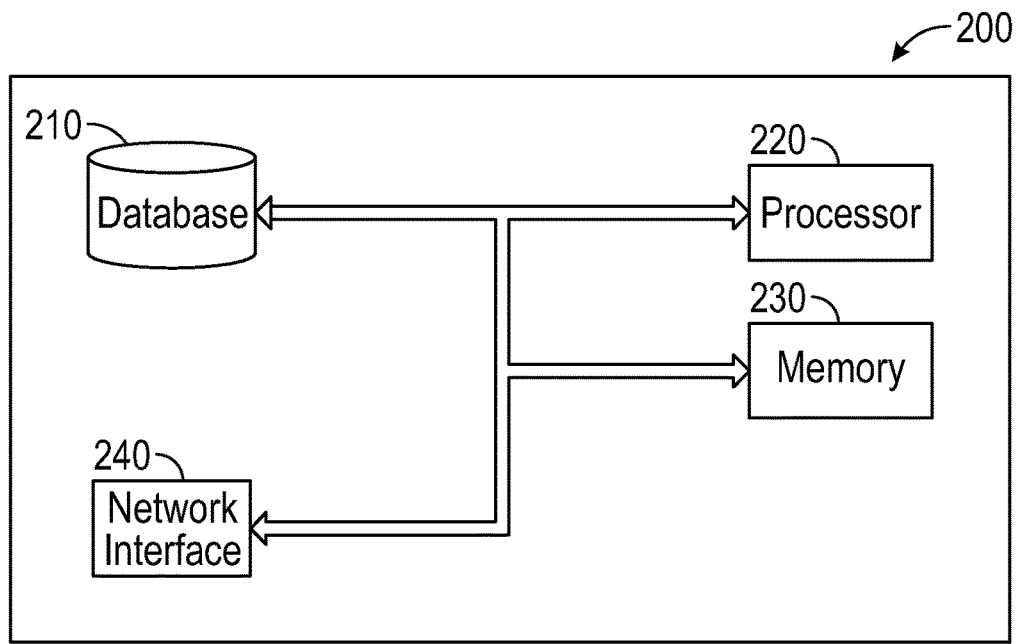
FIG. 2 is a block diagram of a controller of the apparatus of FIG. 1 in accordance with aspects of the present disclosure.
Figure 3:
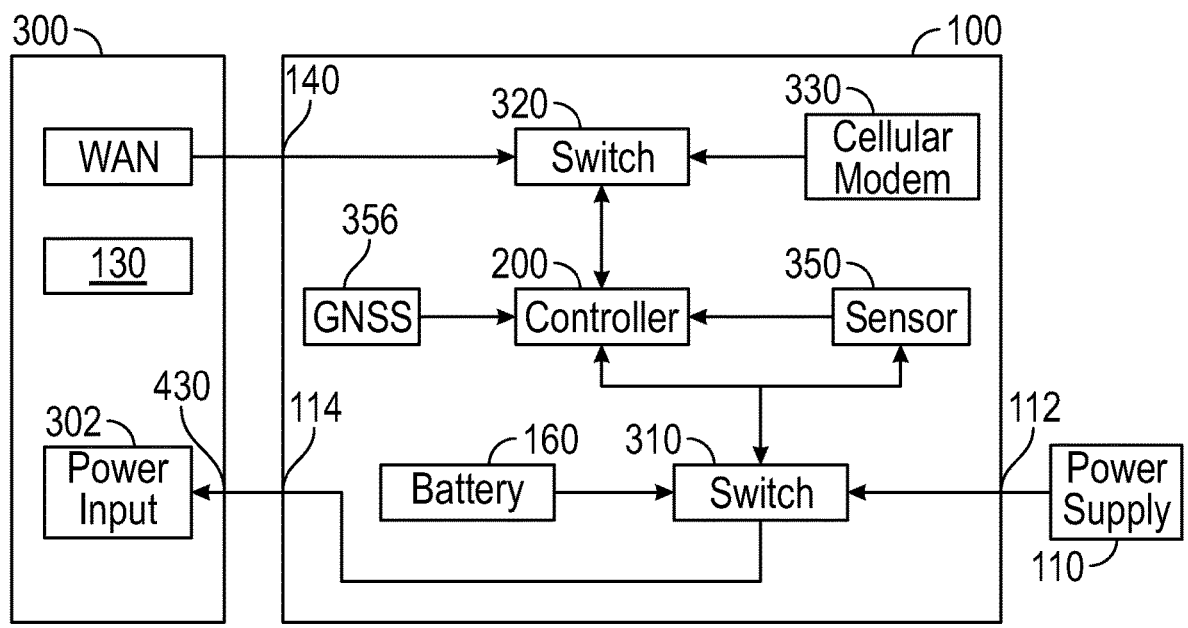
FIG. 3 is a block diagram of the apparatus of FIG. 1 in accordance with aspects of the present disclosure.

Referring to FIGS. 1-3, an exemplary apparatus 100 for internet and power backup in accordance with aspects of the present disclosure is shown. The apparatus 100 generally includes a power source 110 configured for powering the apparatus 100, an integrated battery 160 configured for providing backup power to the apparatus 100, a power output jack 114, a first switch 310, a sensor 350, a network port 140, such as, for example, a Wide Area Network (WAN) port, an integrated cellular modem 330 configured for Internet communications, a second switch 320, and a controller 200 (FIG. 2).

In aspects, the power source 110 may be an external power supply connected to the apparatus 100 via a power input jack 112.

The first switch 310 (FIG. 3) is configured for selectively switching from a first mode where the power source supplies power to the apparatus 100 and a second mode where the integrated battery 160 supplies power to the apparatus 100.

The sensor 350 configured to detect a first signal indicating a presence of power from the power source 110. The sensor 350 is communicatively coupled to the controller 200.

The network port 140 is configured for Internet communications and communicatively coupled to an Internet gateway device 300. In aspects, the primary internet source may be located in the internet gateway device 300, not the apparatus 100 for internet and power backup. In aspects switching between the primary source and the backup source may at least partially occur within the internet gateway device 300. The internet gateway 300 may include a power input port 430 which is configured to be connected to a power supply, such as power output jack 114.

The second switch 320 (FIG. 3) is configured for selectively switching between a third mode where the internet communications is via the network port 140 and a fourth mode where the internet communications is via the integrated cellular modem 330. The second switch 320 enables automatic failover. The controller 200 (FIG. 2) is responsible for detecting the degradation of quality in network connectivity (e.g., low bandwidth, high latency/jitter, no Internet connectivity, etc.) and for automatically switching over to the integrated cellular modem 330 to maintain network connectivity. The apparatus 100 may further include one or more Foreign Exchange Station (FXS) ports 150 configured for Plain Old Telephone System (POTS) line replacement.

The apparatus 100 may further include a Global Positioning Satellite (GPS) receiver 356 configured to monitor geographical location information of the apparatus 100. In aspects, when the FXS ports are being used to provide POTS replacement lines, the controller 200 (FIG. 2) may monitor the geographical location of the apparatus 100 using the GPS receiver 356 and electronically provide the monitored geographical location information of the apparatus 100 when requested by emergency responders.

Referring now to FIG. 2, exemplary components in the controller 200 in accordance with aspects of the present disclosure include, for example, a database 210, one or more processors 220, at least one memory 230, and a network interface 240.

The database 210 can be located in storage. The term "storage" may refer to any device or material from which information may be capable of being accessed, reproduced, and/or held in an electromagnetic or optical form for access by a computer processor. Storage may be, for example, volatile memory such as RAM, non-volatile memory, which permanently hold digital data until purposely erased, such as flash memory, magnetic devices such as hard disk drives, and optical media such as a CD, DVD, Blu-ray disc, or the like.

As described in more detail herein below, the processor 220 executes various processes based on instructions that can be stored in the server memory 230 and utilizing the data from the database 210.

Figure 4:
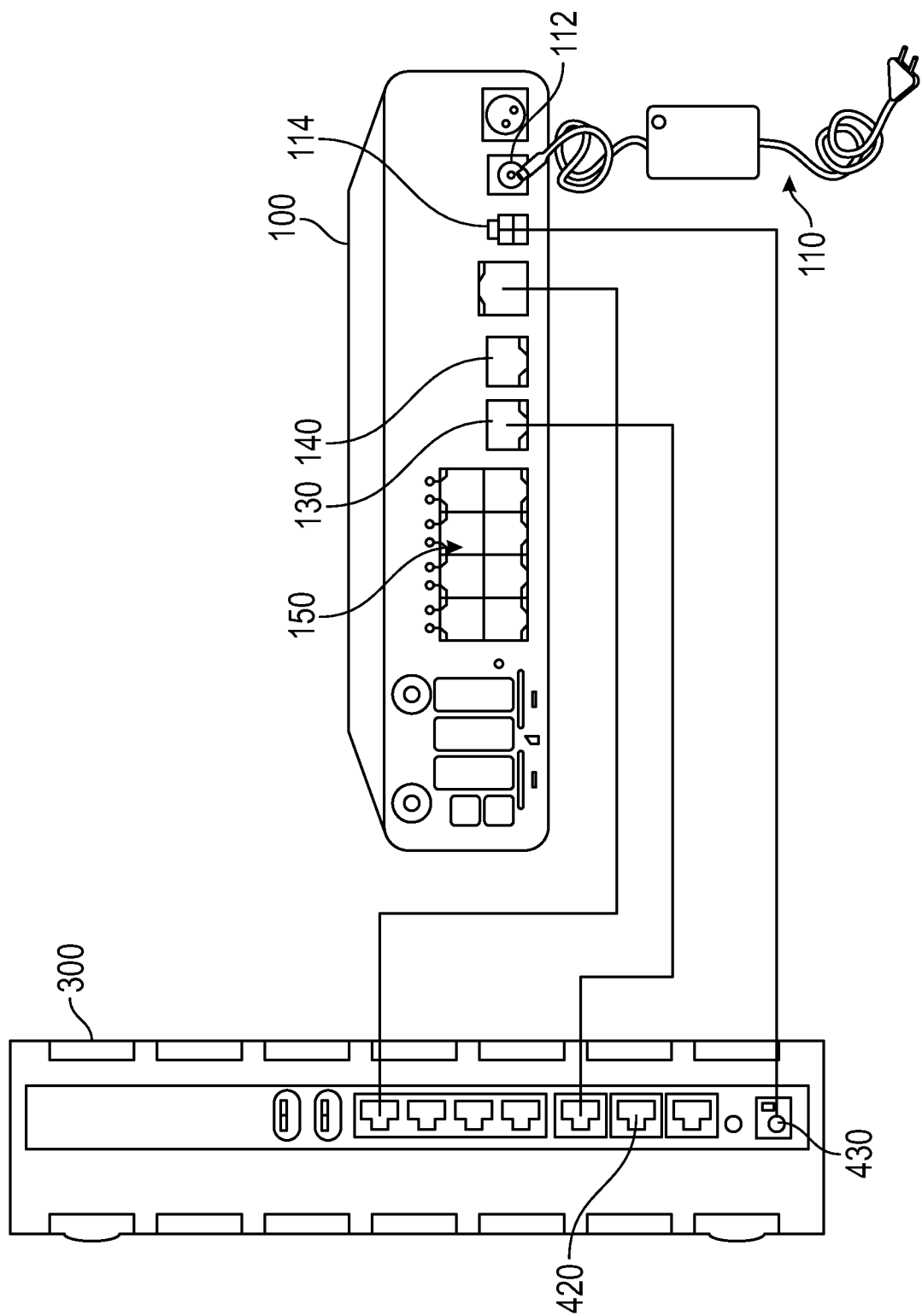
FIG. 4 is a diagram of the apparatus of FIG. 1 connected to an internet gateway device in accordance with aspects of the present disclosure.

Referring to FIG. 4, the apparatus 100 is shown connected to an internet gateway device 300. The internet gateway device 300 is configured to connect from a network, such as an Internet Service Provider, and route the WAN to the local devices such as local computers.

The apparatus 100 may further include a power output connector 114 configured to electrically couple to the Internet gateway device 300 and provide power to the Internet gateway device 300. In aspects, network may include cable, digital subscriber line, and/or fiber.

Figure 5:
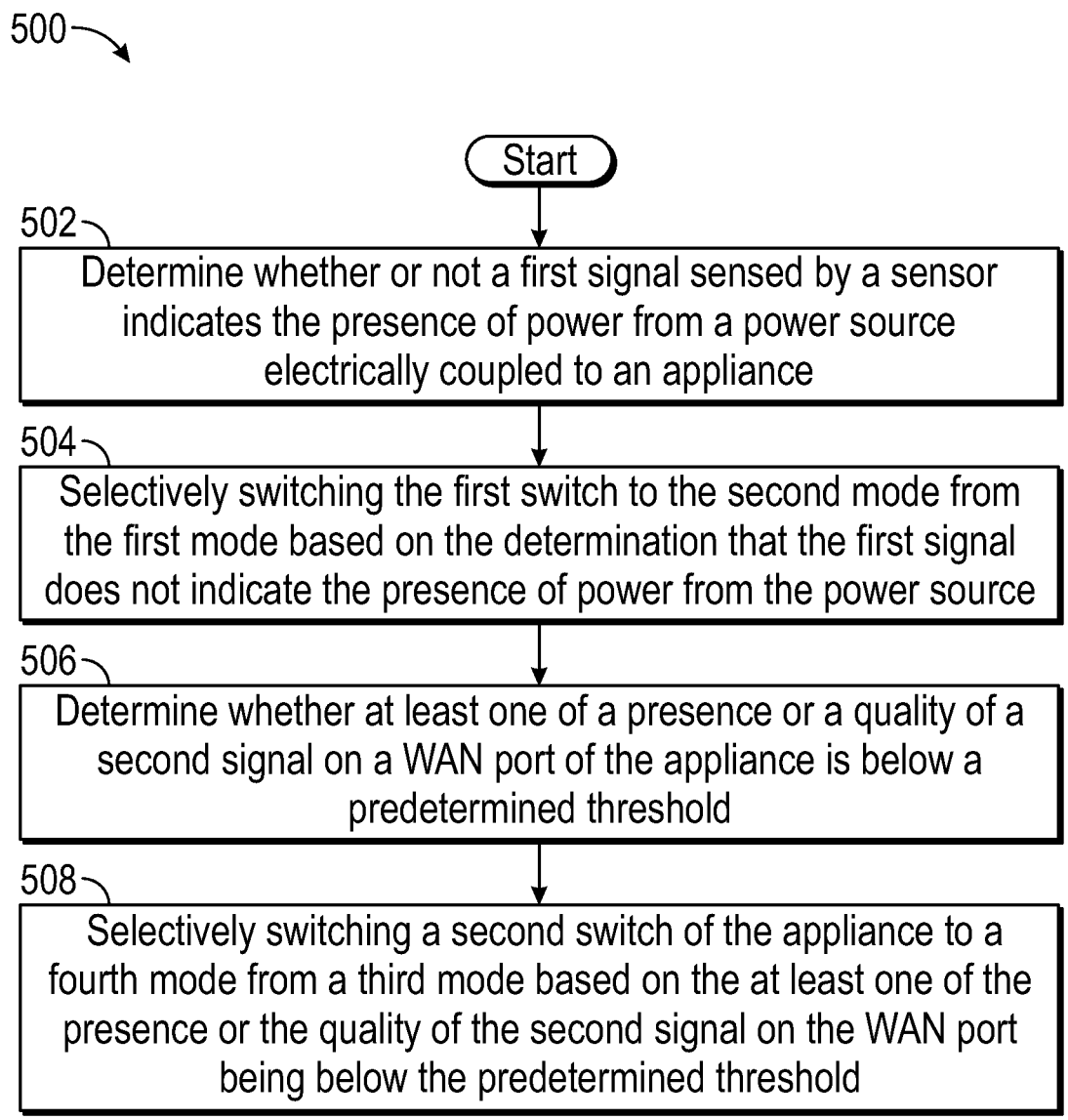
FIG. 5 is a flow diagram of an exemplary method for using the networked environment of FIG. 1 in accordance with aspects of the present disclosure.

FIG. 5 shows a block diagram for an exemplary method for operating an apparatus for internet and power backup, in accordance with aspects of the present disclosure. Although the steps of FIG. 5 are shown in a particular order, the steps need not all be performed in the specified order, and certain steps can be performed in another order. For example, FIG. 5 will be described below with a server (not shown) performing the operations. However, in various aspects, the operations of FIG. 5 may be performed all or in part by the controller 200 of FIG. 2. In aspects, the operations of FIG. 5 may be performed all or in part by another device, for example, a mobile device and/or a client computer system. These variations are contemplated to be within the scope of the present disclosure.

Initially, at step 502 the controller 200 determines whether or not a first signal, sensed by sensor 350 indicates the presence of power from the power source 110 at the power input jack 112.

Next, at step 504, the controller 200 selectively switches the first switch 310 to the second mode (i.e., integrated battery 340 supplying power to the apparatus 100) from the first mode (i.e., the power supply supplying power to the apparatus 100) based on the determination that the first signal does not indicate the presence of power from the power source 110. In aspects, switching of the power source from the power supply supplying power to the apparatus 100 to the integrated battery 340 supplying power to the apparatus 100 without direct control by way of the microprocessor. For example, a relay, energized by the power supply may switch to enable the integrated battery 340 in the absence of AC voltage form the power supply.

Next, at step 506, the controller 200 determines whether at least one of a presence or a quality of a second signal on the network port 140 is below a predetermined threshold. The apparatus 100 enables automatic failover to an integrated cellular modem 330 for when the network port 140 has poor signal or no signal.

Next, at step 408, the controller 200 selectively switches the second switch to the fourth mode from the third mode based on the at least one of the presence or the quality of the second signal on the network port being below the predetermined threshold.

In aspects, the controller 200 may monitor the geographical location of the apparatus using the GPS receiver 356 (FIG. 1), and electronically provide the monitored geographical location information of the apparatus 100 when requested by emergency responders (e.g., an emergency telephone number such as 911).

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages that are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood the foregoing description is only illustrative of the present disclosure. Various alternatives and modifications can be devised by those skilled in the art without departing from the present disclosure. Accordingly, the present disclosure is intended to embrace all such alternatives, modifications, and variances. The embodiments described with reference to the attached drawing figures are presented only to demonstrate certain examples of the present disclosure. Other elements, steps, methods, and techniques that are insubstantially different from those described above are also intended to be within the scope of the present disclosure.

What is claimed is:

1. An apparatus for internet and power backup, said apparatus comprising:

a power source configured for powering the apparatus;
an integrated battery configured for providing backup power to the apparatus;
a first switch configured for selectively switching from a first mode where the power source supplies power to the apparatus and a second mode where the integrated battery supplies power to the apparatus;
a sensor configured to detect a first signal indicating a presence of power from the power source;
a network port configured for Internet communications and communicatively coupled to an Internet gateway device;
an integrated cellular modem configured for Internet communications;
a second switch configured for selectively switching between a third mode where the internet communications is via the network port and a fourth mode where the internet communications is via the integrated cellular modem;
a processor; and
a memory coupled to the processor and storing one or more computer-readable instructions, wherein the computer-readable instructions cause, when executed by the processor, the apparatus to:
  determine whether or not the first signal indicates the presence of power from the power source;
  selectively switch the first switch to the second mode from the first mode based on the determination that the first signal does not indicate the presence of power from the power source;
  determine whether at least one of a presence or a quality of a second signal on the network port is below a predetermined threshold; and
  selectively switch the second switch to the fourth mode from the third mode based on the at least one of the presence or the quality of the second signal on the network port being below the predetermined threshold.

2. The apparatus of claim 1, further comprising one or more Foreign Exchange Station (FXS) ports.

3. The apparatus of claim 2, wherein the FXS port is configured for POTS line replacement functionality.

4. The apparatus of claim 3, further comprising a Global Positioning Satellite (GPS) receiver configured to monitor geographical location information of the apparatus.

5. The apparatus of claim 4, wherein the instructions, when executed by the processor, further cause the apparatus to:
  monitor the geographical location of the apparatus using the GPS receiver; and
  electronically provide the monitored geographical location information of the apparatus when requested by emergency responders.

6. The apparatus of claim 1, further comprising a power output connector configured to electrically couple to the Internet gateway device and provide power to the Internet gateway device.

7. The apparatus of claim 1, wherein the network port is connected to at least one of cable, digital subscriber line, or fiber.

8. A computer-implemented method for internet and power backup, the method comprising:
  determining whether or not a first signal sensed by a sensor indicates the presence of power from a power source electrically coupled to an apparatus, wherein the power source configured for powering the apparatus, and wherein the apparatus includes an integrated battery configured for providing backup power to the apparatus and a first switch configured for selectively switching from a first mode where the power source supplies power to the apparatus and a second mode where the integrated battery supplies power to the apparatus;
  selectively switching the first switch to the second mode from the first mode based on the determination that the first signal does not indicate the presence of power from the power source;
  determining whether at least one of a presence or a quality of a second signal on a network port of the apparatus is below a predetermined threshold, wherein the network port configured for Internet communications and communicatively coupled to an Internet gateway device; and
  selectively switching a second switch of the apparatus to a fourth mode from a third mode based on the at least one of the presence or the quality of the second signal on the network port being below the predetermined threshold, wherein the second switch is configured for selectively switching between the third mode where the internet communications is via the network port and the fourth mode where the internet communications is via an integrated cellular modem of the apparatus.

9. The computer-implemented method of claim 8, wherein the apparatus includes a Foreign Exchange Station (FXS) port.

10. The computer-implemented method of claim 9, wherein the FXS port is configured for POTS line replacement.

11. The computer-implemented method of claim 10, wherein the apparatus further includes a Global Positioning Satellite (GPS) receiver configured to monitor geographical location information of the apparatus.

12. The computer-implemented method of claim 11, further comprising:
  monitoring the geographical location of the apparatus using the GPS receiver; and
  electronically providing the monitored geographical location information of the apparatus when requested by emergency responders.

13. The computer-implemented method of claim 8, wherein the apparatus further includes a power output connector configured to provide power to the Internet gateway device.

14. The computer-implemented method of claim 8, wherein the network port is connected to at least one of cable, digital subscriber line, or fiber.

15. A non-transitory computer-readable storage medium in which is stored instructions for causing a processor to execute a computer-implemented method for internet and power backup, the method comprising:
  determining whether or not a first signal sensed by a sensor indicates the presence of power from a power source, wherein the power source configured for powering an apparatus, the apparatus including an integrated battery configured for providing backup power to the apparatus and a first switch configured for selectively switching from a first mode where the power source supplies power to the apparatus and a second mode where the integrated battery supplies power to the apparatus;
  selectively switching the first switch to the second mode from the first mode based on the determination that the first signal does not indicate the presence of power from the power source;

determining whether at least one of a presence or a quality of a second signal on a network port of the apparatus is below a predetermined threshold, wherein the network port configured for Internet communications and communicatively coupled to an Internet gateway device; and selectively switching a second switch of the apparatus to a fourth mode from a third mode based on the at least one of the presence or the quality of the second signal on the network port being below the predetermined threshold, wherein the second switch is configured for selectively switching between the third mode where the internet communications is via the network port and the fourth mode where the internet communications is via an integrated cellular modem of the apparatus.

16. The computer-implemented method of claim 15, wherein the apparatus includes a Foreign Exchange Station (FXS) port.

17. The computer-implemented method of claim 16, wherein the FXS port is configured for POTS line replacement.

18. The computer-implemented method of claim 17, wherein the apparatus further includes a Global Positioning Satellite (GPS) receiver configured to monitor geographical location information of the apparatus.

19. The computer-implemented method of claim 18, further comprising:
monitoring the geographical location of the apparatus using the GPS receiver; and
electronically providing the monitored geographical location information of the apparatus when requested by emergency responders.

20. The computer-implemented method of claim 15, wherein the apparatus further includes a power output connector configured to provide power to the Internet gateway device.

\* \* \* \* \*